United States Patent
Blau

(10) Patent No.: US 12,080,020 B2
(45) Date of Patent: Sep. 3, 2024

(54) DETERMINATION OF IMAGING DIRECTION BASED ON A 2D PROJECTION IMAGE

(71) Applicant: metamorphosis GmbH, Altenbeken (DE)

(72) Inventor: Arno Blau, Staufen (DE)

(73) Assignee: METAMORPHOSIS GMBH (DE)

( * ) Notice: Subject to any disclaimer, the term of this patent is extended or adjusted under 35 U.S.C. 154(b) by 586 days.

(21) Appl. No.: 17/250,683

(22) PCT Filed: Aug. 20, 2019

(86) PCT No.: PCT/EP2019/072223
§ 371 (c)(1),
(2) Date: Feb. 19, 2021

(87) PCT Pub. No.: WO2020/038917
PCT Pub. Date: Feb. 27, 2020

(65) Prior Publication Data
US 2021/0295553 A1    Sep. 23, 2021

(30) Foreign Application Priority Data

Aug. 23, 2018 (LU) .................................. LU100907

(51) Int. Cl.
*G06T 7/73* (2017.01)
*G06T 7/13* (2017.01)

(52) U.S. Cl.
CPC .................. *G06T 7/73* (2017.01); *G06T 7/13* (2017.01); *G06T 2207/10116* (2013.01); *G06T 2207/20081* (2013.01); *G06T 2207/20084* (2013.01); *G06T 2207/30008* (2013.01)

(58) Field of Classification Search
CPC ... G06T 7/73; G06T 7/13; G06T 2207/10116; G06T 2207/20081; G06T 2207/20084; G06T 2207/30008
USPC ......................................................... 382/128
See application file for complete search history.

(56) References Cited

U.S. PATENT DOCUMENTS

| 2006/0023929 | A1  | 2/2006  | Luo et al. |
| 2013/0094742 | A1  | 4/2013  | Feilkas |
| 2015/0330915 | A1* | 11/2015 | Jin ........................ G01N 23/225 378/62 |
| 2016/0071264 | A1* | 3/2016  | Agam .................. G06V 10/774 382/128 |

(Continued)

FOREIGN PATENT DOCUMENTS

EP        2801320 A1    11/2014

OTHER PUBLICATIONS

EPO, International Search Report issued in International Application No. PCT/EP2019/072223, mailed Sep. 27, 2019.

(Continued)

*Primary Examiner* — Michael R Neff
(74) *Attorney, Agent, or Firm* — Lorenz & Kopf LLP

(57) ABSTRACT

Based on deep neural net and possibly on an active shape model approach, the complete outline of an anatomy may be determined and classified. Based on certain features, an algorithm may assess whether the viewing angle of the C-arm is sufficient or not. In a further step, an algorithm may estimate how far away from the desired viewing angle the current viewing angle is and may provide guidance on how to adjust the c-arm position to reach the desired viewing angle.

14 Claims, 5 Drawing Sheets

(56) References Cited

U.S. PATENT DOCUMENTS

2018/0206812 A1    7/2018 Trautwein et al.

OTHER PUBLICATIONS

Pries, A., et al. "Deep Morphing: Detecting bone structures in fluoroscopic x-ray images with prior knowledge", arxiv.org, Cornell University Library, Aug. 9, 2018, XP080907450.

Wang, L., et al. "Fast Automated Segmentation of Femoral Head in Fluoroscopic X-Ray Images", 8th IEEE International Symposium on Biomedical Imaging, 2011, pp. 984-988, From Nano to Macro, Chicago, IL, USA, 2011.

* cited by examiner

A

B though bone) is taken as an example to illustrate the background of the invention. It will be apparent for a skilled person that similar situations can occur when treating other fractured bones.

DETERMINATION OF IMAGING DIRECTION BASED ON A 2D PROJECTION IMAGE

CROSS-REFERENCE TO RELATED APPLICATIONS

This application is a U.S. National-Stage entry under 35 U.S.C. § 371 based on International Application No. PCT/EP2019/072223, filed Aug. 8, 2019, which was published under PCT Article 21(2) and which claims priority to Luxembourg Application No. 100907, filed Aug. 23, 2018, which are all hereby incorporated in their entirety by reference.

FIELD OF INVENTION

The invention relates to the field of computer assisted surgery. In particular, the invention relates to a device and a method for determining an imaging direction based on a 2D X-ray projection image. The method may be implemented as a computer program executable on a processing unit of the device.

BACKGROUND OF THE INVENTION

The situation when treating a fractured femur (thigh bone) is taken as an example to illustrate the background of the invention. It will be apparent for a skilled person that similar situations can occur when treating other fractured bones.

In a case in which the shaft of a femur is fractured, an intramedullary nail may be inserted into the medullary channel of the bone to stabilize the parts of the bone during the healing of the fracture. The surgical procedure for implanting an intramedullary nail is minimally invasive, thus requiring repeated acquisition of X-ray images to enable the surgeon to correctly place the nail. The nail may also be fixated by one or more locking screws, whose correct choice and placement also requires acquisition of X-ray images.

Steps in such a surgical procedure require that an X-ray image be acquired from a specific imaging direction, which describes the direction in which the X-ray beam passes through the anatomy. For instance, it may be required that the imaging direction be anterior-posterior (AP), in which case an image of the hip joint is acquired with a vertical imaging direction and with the hip of the patient lying flat on a table. As another example, it may be required that the imaging direction matches the direction of another, previously acquired, reference X-ray image.

It is often a challenge for the surgeon to determine the actual orientation of, for example, the femur neck based on an acquired X-ray projection image. In fact, the surgeon or X-ray technician subjectively judge whether the acquired X-ray image was taken from the desired angle such that the image provides the maximum amount of information for a procedural step. As there is typically no precise reference in the image, the angle could still be off by 5 to 10 degrees even if the image was judged to be taken from the desired angle. In some circumstances this deviation could be too high because it might introduce significant imprecision into the surgical procedure. In addition, other objects, desirable features and characteristics will become apparent from the subsequent summary and detailed description, and the appended claims, taken in conjunction with the accompanying drawings and this background.

SUMMARY OF THE INVENTION

It would be beneficial for the surgeon to have an objective measurement of the current X-ray imaging direction. If the current imaging direction is not the desired direction, it would be desirable to receive instructions on how to reposition the X-ray machine in order to reach the desired imaging direction.

It may be seen as an object of the invention to provide at least a device and a method for determining an imaging direction relative to an anatomical structure. It may also be seen as an object of the invention to overcome or at least mitigate the above mentioned problems, and to facilitate the assessment of a current anatomical situation.

This is achieved by the subject-matter of each of the independent claims. Further embodiments are described in the respective dependent claims.

The general concept of the invention can be described as following. First of all, specific anatomical features may be identified by an algorithm in an X-ray image. From relative locations of these features in the image, it may be possible to determine whether the actual imaging direction matches a desired imaging direction. E.g., for entry point support for inserting the nail into the bone marrow, an oblique lateral view may be required in order to assess the current position of an opening instrument with respect to the detected bone shaft axis. It may be possible to determine whether the imaging direction is suitable by comparing in the acquired X-ray image the position of, for example, the greater trochanter to the extended bone shaft axis. If these are close, the imaging direction may be considered by the algorithm as acceptable. If these are not close, the imaging direction is not suitable. A skilled person will understand that there are more than these described features an algorithm could make use of.

As used herein, the term "feature" of an anatomical structure like a bone refers to any part of the structure that may be suitable for determining a geometrical aspect, including, but not limited to, a point, a line, an arc, a center point, an axis, a cylinder surface, a ball surface, or the like. Such geometrical aspects are in particular suitable for determining a longitudinal axis and/or a vector. For example, a geometrical aspect of a femur may be the outer surface of the femur head, an axis defined by the neck between shaft and femur head, a longitudinal axis of the femur shaft, a most distal point on the bone surface, a line defined by the center points of the condyles, or a line defined by the most posterior points of the condyles. It will be understood that the other long bones provide other and/or comparable geometrical aspects. Any such geometrical aspects of identified features of anatomical structures may be suitable for determining an imaging direction.

There exist algorithms that determine the location of specific bone features in X-ray images. These algorithms are often based on edge detection. An example is the localization of the femoral head as described in the paper: Michael Kohnen, Ola Friman, Horst K. Hahn: Fast automated segmentation of femoral heads in fluoroscopic X-ray images. In Proceedings of the 8th IEEE International Symposium on Biomedical Imaging, 2011: 984-988.

A more flexible approach is the localization and anatomical labeling (classification) of an entire bone. An example of such an approach is: Aaron Pries, Peter J. Schreier, Artur Lamm, Stefan Pede, Jürgen Schmidt: Deep morphing: Detecting bone structures in fluoroscopic X-ray images with prior knowledge, available online at https://arxiv.org/abs/1808.04441. This paper proposes an approach based on a deep neural network to detect bone structures in fluoroscopic X-ray images. The technique specifically addresses the challenges in the automatic processing of fluoroscopic X-rays, namely their low quality and the fact that typically only a small dataset is available for training the neural network. The technique incorporates high-level information about the objects in the form of a statistical shape model. The technique consists of a two-stage approach (called deep morphing), where in the first stage a neural segmentation network detects the contour of the bone or other object, and then in the second stage a statistical shape model is fit to this contour using an Active Shape Model algorithm (but other algorithms can be used as well for the second stage). This combination allows the technique to classify points on the object contour. For instance, in the segmentation of a femur, the technique will be able to determine which points on the contour in the 2D X-ray projection image correspond to the lesser trochanter, and which points correspond to the femoral neck, etc. The paper demonstrates that deep morphing can successfully and accurately localize bones in fluoroscopic X-ray images. This technique can be used to automatically localize the features from which the imaging direction is determined. It should be mentioned, however, that the classification by this algorithm does neither need nor provide 3D information.

Once features have been identified in an X-ray image, they can be used by an algorithm to evaluate the imaging direction. For example, the locations of selected features in an actual image may be compared with those in a reference image so as to evaluate the imaging direction of the actual image relative to the imaging direction of the reference image. An imaging direction may be evaluated based on relative positions of two or more features in the image. Information about relative sizes and locations of anatomical features (e.g., femoral head and greater trochanter) may be utilized. In a further step, an algorithm may provide guidance on how to adjust an imaging device in order to reach the desired viewing angle.

The selection of features for the computation of the imaging direction can be done manually, by design of an algorithm or automatically by an algorithm. "By design" means that in the design of the algorithm, an engineer selects which features to use and how to use/weight them (e.g., based on how reliably a feature was detected in the image or how much anatomical variability there is in a feature). Automatic selection could be done by a deep neural network, which learns which features to use and how to use/weight them for evaluating the imaging direction. The evaluation could be with respect to a reference image, it could be quantitative, or it could be qualitative. For a qualitative evaluation, the deep neural net may be taught or trained by a very large number of images including their classification (on C-arm rotation: image intensifier too anterior, too posterior etc; on C-arm translation: too distal, too proximal etc. . . . ).

The accuracy of the determined imaging direction may increase the more different features or aspects in an X-ray image are utilized for determining the direction. These features may also come from more than one X-ray image. A further possibility for improvement of the result may be to combine results from two or more images possibly acquired from different directions. Again, information, e.g. from a database, about relative sizes and locations of anatomical features (e.g., femoral head and greater trochanter) may be utilized for this combination. As before with the selection of features, the combination of features from different X-ray images for the computation of the imaging direction by the algorithm can be done by design or automatically (e.g., when using a deep neural net).

It is noted that this invention may be used for many different clinical issues, basically whenever there is a need to evaluate the relative position between imaging device and anatomy, like for total hip replacement (a feature that could be used is the arboretum foramen), determination of caput-collum-diaphyseal (CCD) angle (here, a true AP imaging direction is needed), and so on.

A device for an interpretation of an X-ray image, as described herein in accordance with several embodiments, comprises a processing unit adapted to receive image data of the X-ray image, to identify an anatomical structure within the X-ray image, and to determine an imaging direction relative to the anatomical structure.

According to an embodiment, the processing unit may receive a desired imaging direction of a specific anatomical structure, or a neural net may have learned which imaging direction is preferred. The processing unit may then calculate the deviation of the actual imaging direction from the desired imaging direction. Additionally, the processing unit may provide instructions to a user or an imaging device so as to cause a change of the imaging direction from the actual imaging direction to the preferred/desired imaging direction.

It is noted that the image data of the X-ray image may be received directly from an imaging device, for example from a C-arm based 2D X-ray device, or alternatively from a data base. Furthermore, the image data may be generated artificially, i.e. may represent a simulated X-ray image. The image may represent an anatomical structure of interest, in particular, a bone.

Any bone, for example, a bone of a hand or foot, in particular a long bone of the lower extremities, like the femur and the tibia, and of the upper extremities, like the humerus, may be subject to an embodiment of the method.

According to an embodiment, the anatomical structure is localized and identified by means of a neural net. The neural net is trained based on a multiplicity of data that is comparable to the data on which it will be applied. In case of an assessment of bone structures in images, the neural net should be trained on the basis of a multiplicity of X-ray images of bones of interest. It will be understood that the neural net may also be trained on the basis of simulated X-ray images. Simulated X-ray images may, for example, be generated from 3D CT data, as described in the appendix of the paper: Aaron Pries, Peter J. Schreier, Artur Lamm, Stefan Pede, Jürgen Schmidt: Deep morphing: Detecting bone structures in fluoroscopic X-ray images with prior knowledge, available online at https://arxiv.org/abs/1808.04441.

According to an embodiment, more than one neural network may be used, wherein each of the neural nets may specifically be trained for a sub-step necessary to achieve a desired solution. For example, a first neural net may be trained to evaluate X-ray image data so as to localize an anatomical structure, whereas a second neural net may be trained to determine a 3D-orientation of that structure relative to an imaging direction of the evaluated image. Based on the determined 3D orientation, the processing unit may simply provide a corresponding information to a user of the device. It is also possible to combine neural networks with other algorithms, including but not limited to, Active Shape Models. It is noted that a neural net may also learn to determine an imaging direction without the need to first identify features in an image or classify anatomical structures.

It is noted that the processing unit may be realized by only one processor performing all the steps of the process, or by a group or plurality of processors, for example a central processor for controlling (i) a first sub-processor on which a first neural net is implemented assessing the image data including an identification of anatomical structures like a bone surface, (ii) a second sub-processor on which a second neural net is implemented specialized for determining an imaging direction of the identified anatomical structure, and (iii) a further processor for controlling a monitor for visualizing results. The central processor may also control movements of, for example, a C-arm of an X-ray imaging device.

According to an embodiment, the device may further comprise storage means providing a database for storing, for example, X-ray images. It will be understood that such storage means may also be provided in a network to which the system may be connected, and that data related to the neural net may be received over that network.

Furthermore, the device may comprise an imaging unit for generating at least one 2D X-ray image, wherein the imaging unit may be capable of generating images from different directions.

The device may further comprise input means for manually determining a position in the X-ray image, for example a bone surface, for measuring a distance in the image. Such input means may be for example a computer keyboard, a computer mouse or a touch screen, to control a pointing device like a cursor on a monitor screen, which may also be included in the device.

According to a further embodiment, a computer software or computer program product is provided including sets of instructions, which when executed on an appropriate device, causes the device to perform aspects as described above.

A computer program may preferably be loaded into the random access memory of a data processor. The data processor or processing unit may thus be equipped to carry out at least a part of the described method. Further, the invention relates to a computer-readable medium such as a CD-ROM on which the computer program may be stored. However, the computer program may also be presented over a network like the World Wide Web and can be downloaded into the random access memory of the data processor from such a network.

Aspects of embodiments may be summarized as follows.

It is a major aim of the disclosed embodiments to detect/determine an imaging or viewing direction of an X-ray imaging device relative to an anatomy, based on a 2D projection image generated by that device.

An aspect is an evaluation whether the imaging direction is close enough to a desired imaging direction.

In the disclosed embodiments, at least one computer algorithm is used that utilizes certain features in images.

A computer algorithm may use edge detection to find features of an anatomical structure in a projection image.

Alternatively, or additionally, a deep neural net may be used, wherein the neural net may be trained on detection of specific features, i.e. looking for those features (and evaluating their relative position to each other).

A deep neural net may act as a semantic edge detector and/or may predict parameters of geometric shapes.

A deep neural net may be trained on images, either on actual or on simulated or on a combination thereof, to detect features.

Alternatively, or additionally, an active shape model/point distribution model approach or variant thereof may be applied to detect or classify features in a projection image.

Another aspect may be detecting and computing/estimating a deviation of the viewing/imaging direction from a desired or a preferred direction.

Further, a viewing direction may be detected, without having a reference (e.g. a desired viewing direction) with respect to one rotational axis (e.g. shaft axis) and/or with respect to a translational movement (e.g. parallel to shaft axis).

A guiding function may be provided that does not only measure the current view and determines the deviation from a desired view, but also determines the required movement(s) of the X-ray imaging device for all available/needed degrees of freedom.

Another image may be used as reference, wherein a reference image may be of a healthy side as reference by diagnostic X-ray imaging, and/or wherein a reference image may be of a healthy side as reference by intra-operative X-ray imaging, and/or wherein a reference image may be a preoperative image from a well defined direction (like AP or ML) by diagnostic X-ray imaging.

The instructions shown or executed by the system for repositioning of the X-ray imaging device may be adapted depending on the task.

It has to be noted that embodiments are described with reference to different subject-matters. In particular, some embodiments are described with reference to method-type claims (computer program) whereas other embodiments are described with reference to apparatus-type claims (device). However, a person skilled in the art will gather from the above and the following description that, unless otherwise specified, any combination of features belonging to one type of subject-matter as well as any combination between features relating to different subject-matters is considered to be disclosed with this application.

The aspects defined above and further aspects, features and advantages of the present invention can also be derived from the examples of the embodiments to be described hereinafter and are explained with reference to examples of embodiments also shown in the figures, but to which the invention is not limited.

BRIEF DESCRIPTION OF THE DRAWINGS

The present invention will hereinafter be described in conjunction with the following drawing figures, wherein like numerals denote like elements, and.

Figure 1:
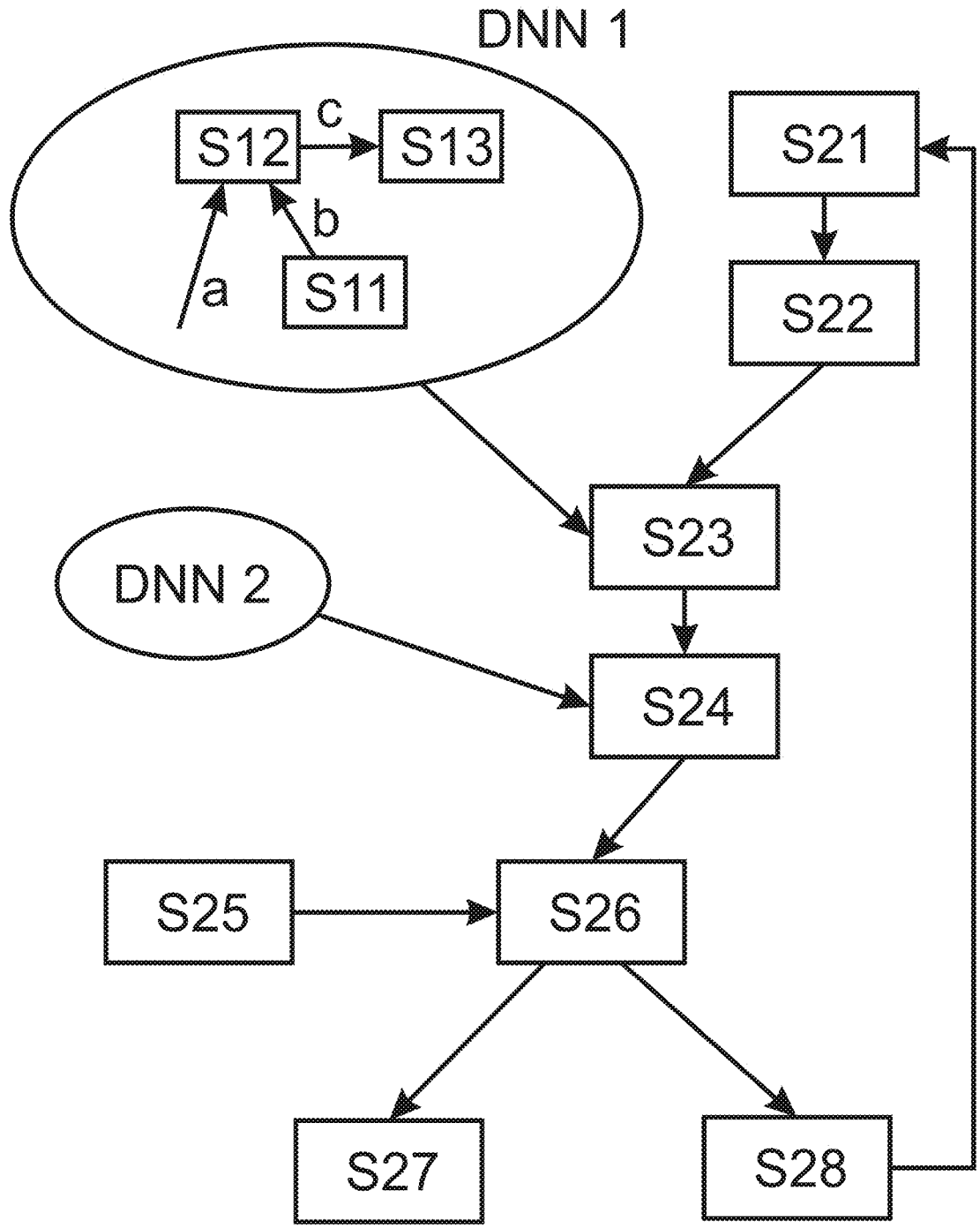
FIG. 1 shows a flow chart of procedural steps in accordance with an embodiment.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures.

DETAILED DESCRIPTION OF THE EMBODIMENTS

The following detailed description is merely exemplary in nature and is not intended to limit the invention or the application and uses of the invention. Furthermore, there is no intention to be bound by any theory presented in the preceding background of the invention or the following detailed description.

The flow-chart in FIG. 1 illustrates the principle of the steps performed in accordance with an embodiment of the disclosed invention. It will be understood that the steps described are major steps, wherein these major steps might be differentiated or divided into several sub-steps. Furthermore, there might be also sub-steps between these major steps.

As a first aspect, "training" of a so-called "deep neural net" (DNN) is described with reference to steps S11, S12 and S13 in FIG. 1.

When training a DNN, for example, to be able to identify an anatomical structure in an X-ray image, an image with known ground truth is provided to the DNN. Indicated with the arrow 'a' in FIG. 1 is the possibility to provide a real image (generated by imaging a patient). The step S11 may be seen as a step of generating a simulated X-ray image. A simulated image may thus be provided at arrow 'b' to the DNN (alternatively or additionally to a provision of a real image along arrow 'a'), which assesses the image in step S12. For example, the algorithm may assign to each pixel of the image a likelihood that a pixel is part of an anatomic feature or aspect. In step S13, the DNN (here DNN 1) may be able to provide information on whether a plurality of pixels constitute an anatomic structure. Based on processing a multiplicity of images and comparing the results with the known ground truth, the parameters of the DNN are adjusted, and the DNN "learns" to identify for example a femur so as to be able to do so even if an actual image shows a femur in a way that differs from all images used in the training phase. As already described above, the DNN may include aspects of active shape models, point distribution models, or the like.

Figure 3:
FIG. 3 shows an example of x-ray images suitable for training a neural net to recognize an aspect of an anatomy.
Figure 3:
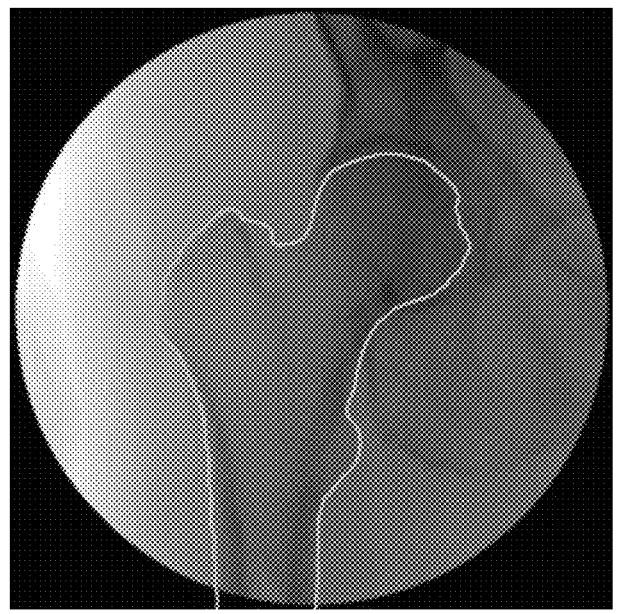

As an example, FIG. 3 shows two X-ray visualizations of a hip joint with a part of hip bone and a proximal part of a thigh bone (a femur). After assessing the upper visualization A in FIG. 3, a DNN may indicate the contour of the femur as in visualization B. It will however be understood by a person skilled in applying a DNN that the DNN may also identify the femur without an indication of the contour.

In step S21 in FIG. 1, a first X-ray image may be generated by an X-ray imaging device with a first imaging direction. The first X-ray image is then received in step S22 by a processing unit.

As used herein, the term "receiving an image" basically refers to the fact that at least one image is necessary to perform the subsequent steps. That is, the term "receiving an image" may encompass both receiving of an image directly when generated by an imaging device and loading of an image from a data base into a processing unit. It is just required that a received image is suitable for identifying an aspect or feature of a bone. A person skilled in the art will consequently understand that the image processing as described herein may be performed independently from an imaging device.

In step S23, the received image is processed utilizing DNN 1, wherein at least one anatomical feature is identified and a location thereof is determined. This may be done as described above.

In step S24, the identified anatomical feature as well as the location information thereof is further processed so as to determine the first imaging direction of the first X-ray image. In the embodiment illustrated in FIG. 1, step S24 is performed utilizing a second deep neural net DNN 2 for determination of the first imaging direction. The second deep neural net DNN 2 may be trained on the basis of images like those of FIGS. 4 and 5.

Figure 4:
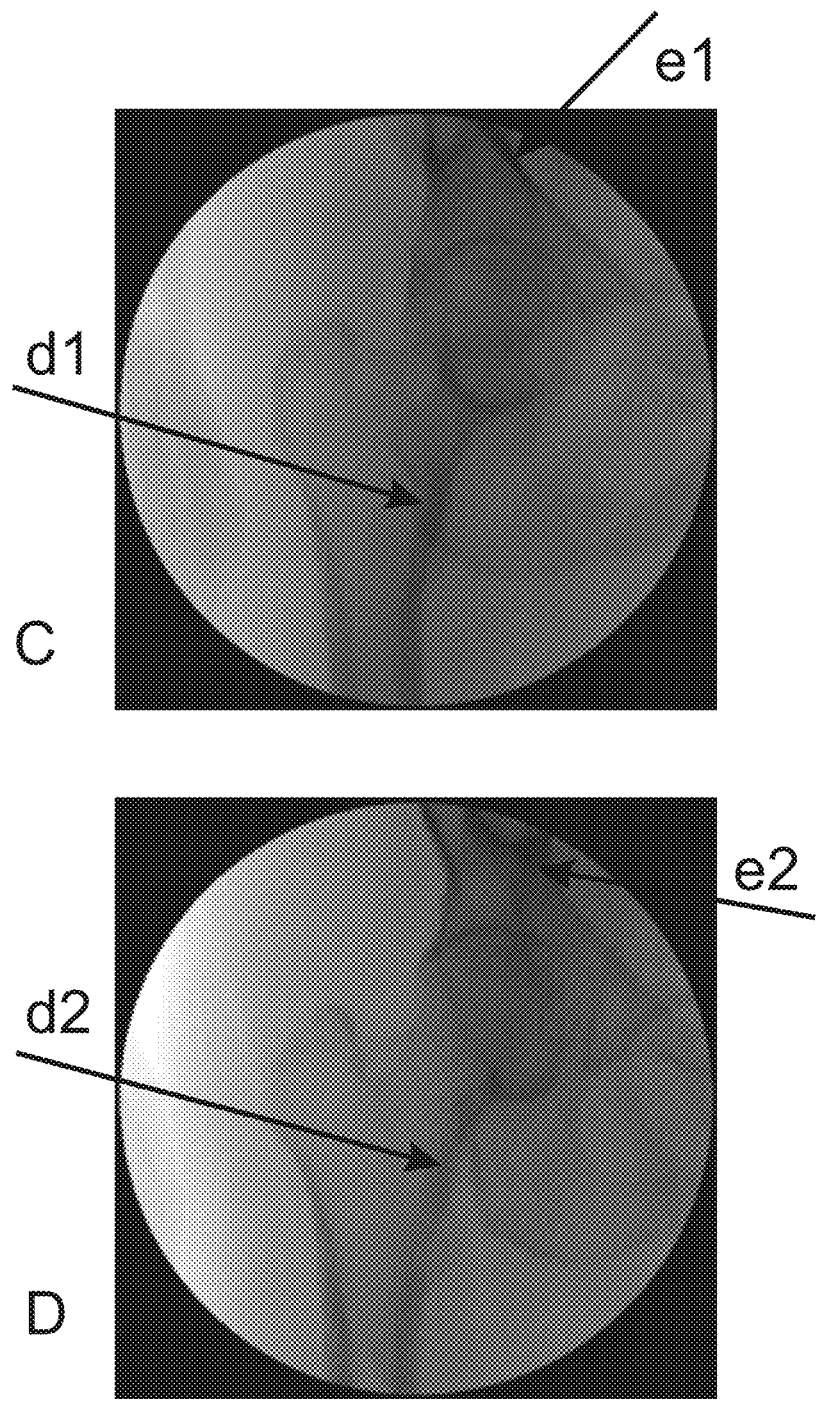
FIG. 4 shows an example of simulated x-ray images of a hip joint generated with different AP imaging directions, suitable for training a neural net to determine an imaging direction.

FIG. 4 shows X-ray images C and D with a visualization of a hip joint. These images are generated more or less in an anterior-posterior (AP) direction, but the imaging directions actually differ from each other by approximately 20 to 25 degrees. The different angles of the viewing directions onto the anatomy can be recognized for example when comparing the points denoted in the images of FIG. 4 as d1 and d2 as well as e1 and e2. Further differences are visible in the shape of the greater trochanter and/or the visible length of the femur neck. All such differences may be utilized by an algorithm to determine the actual imaging direction of the respective X-ray image. Assuming that, for example, a sufficiently accurate contour of the greater trochanter can be determined in step S23, characteristics of that contour may allow a determination of the viewing or imaging direction.

Figure 5:
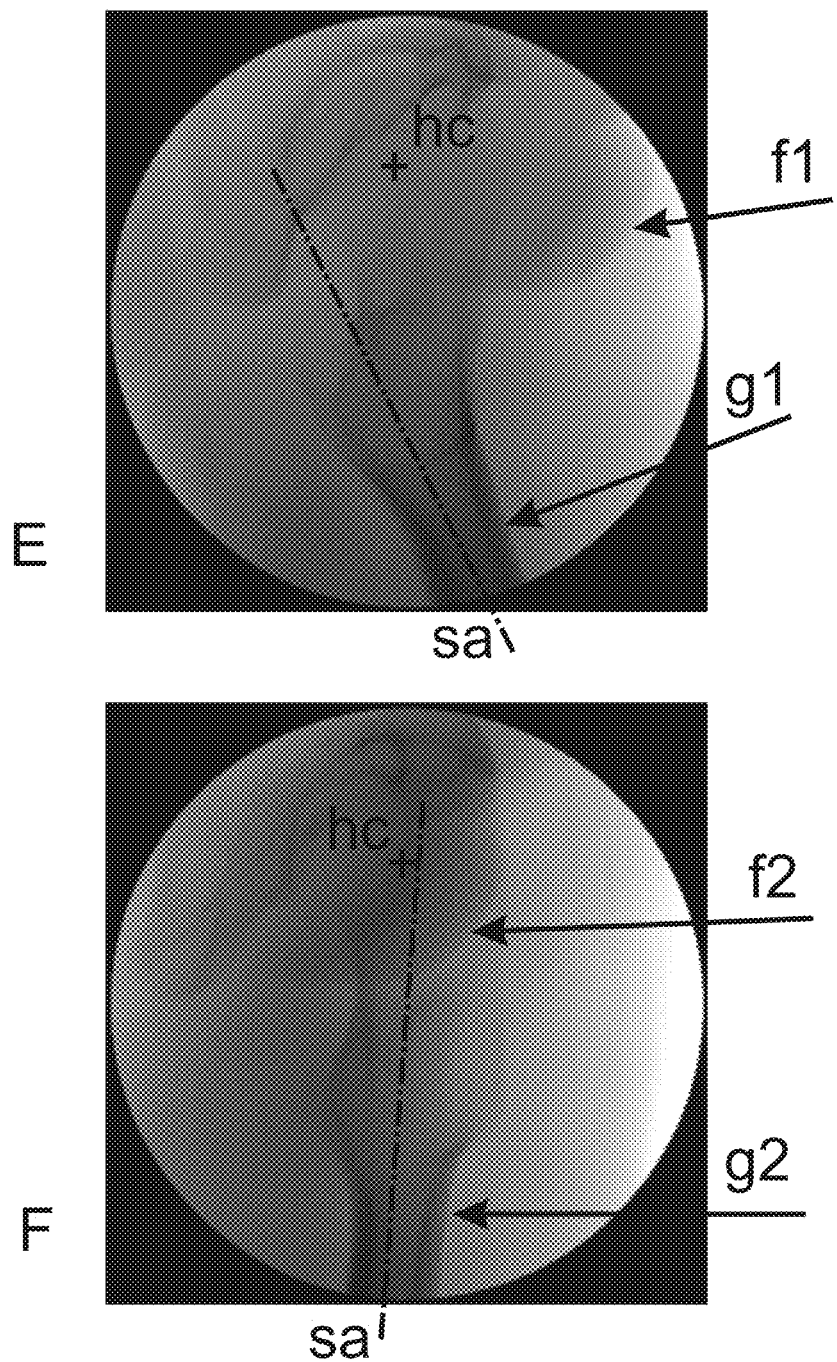
FIG. 5 shows an example of simulated x-ray images of a hip joint generated with different ML imaging directions, suitable for training a neural net to determine an imaging direction.

A similar situation can be seen in the example of FIG. 5 illustrating two images E and F generated more or less in a medio-lateral (ML) direction, but only one of them is a true ML image. Here again, the features of the anatomical structures change their appearance depending on the specific imaging direction, and the different appearances help in determining the imaging direction. For example, the hip bone changes its position relative to the femur as indicated by arrows f1 and f2. In a medio-lateral (ML) view, the position of the center of the femur head hc relative to the axis of the femur shaft sa may be of interest. In image E of FIG. 5, the femur seems tilted so that the femur head center hc lies far away from an extension of the shaft axis sa. By contrast, in image F of FIG. 5, the head center hc is close to the extension of the shaft axis sa. The imaging direction of image F in FIG. 5 seems almost true ML. As an alternative to the head center hc, an axis of the femur neck may be utilized for a determination of an imaging direction. In a case in which the axis of the femur shaft is parallel to an axis of the femur neck in a projection image, that image can be considered as generated with a medio-lateral ML imaging direction.

An algorithm trained on the basis of a multiplicity of images all having slightly different appearance of the visible anatomical structures and being generated with differing imaging directions, is able to determine an imaging direction with high accuracy, even when compared with the accuracy of an experienced human estimating the viewing direction of an X-ray image.

Assuming that a patient, and particularly the part of interest of the patient, is not moving on a patient table, the determination of an imaging direction based on a lateral (more or less ML) image may lead to an accurate positioning of an imaging device for generating an AP image with a desired imaging direction.

The determined imaging direction may be compared in step S26 (FIG. 1) with a desired imaging direction, which may be defined in step S25 by a user depending on the needs. The desired imaging direction may, for example, simply be given by a reference image, wherein the imaging direction of that reference image may be determined as described above. The comparison of the actual imaging direction of the first X-ray image with the desired direction in step S26 allows a calculation of a deviation, wherein that deviation may be provided to a user (a surgeon) for example as information on a monitor in step 527, and/or may be provided to an imaging device in form of adjustment instructions so that the imaging device may automatically be repositioned for generating a second X-ray image with a second imaging direction in step S21, starting the described process again.

Figure 2:
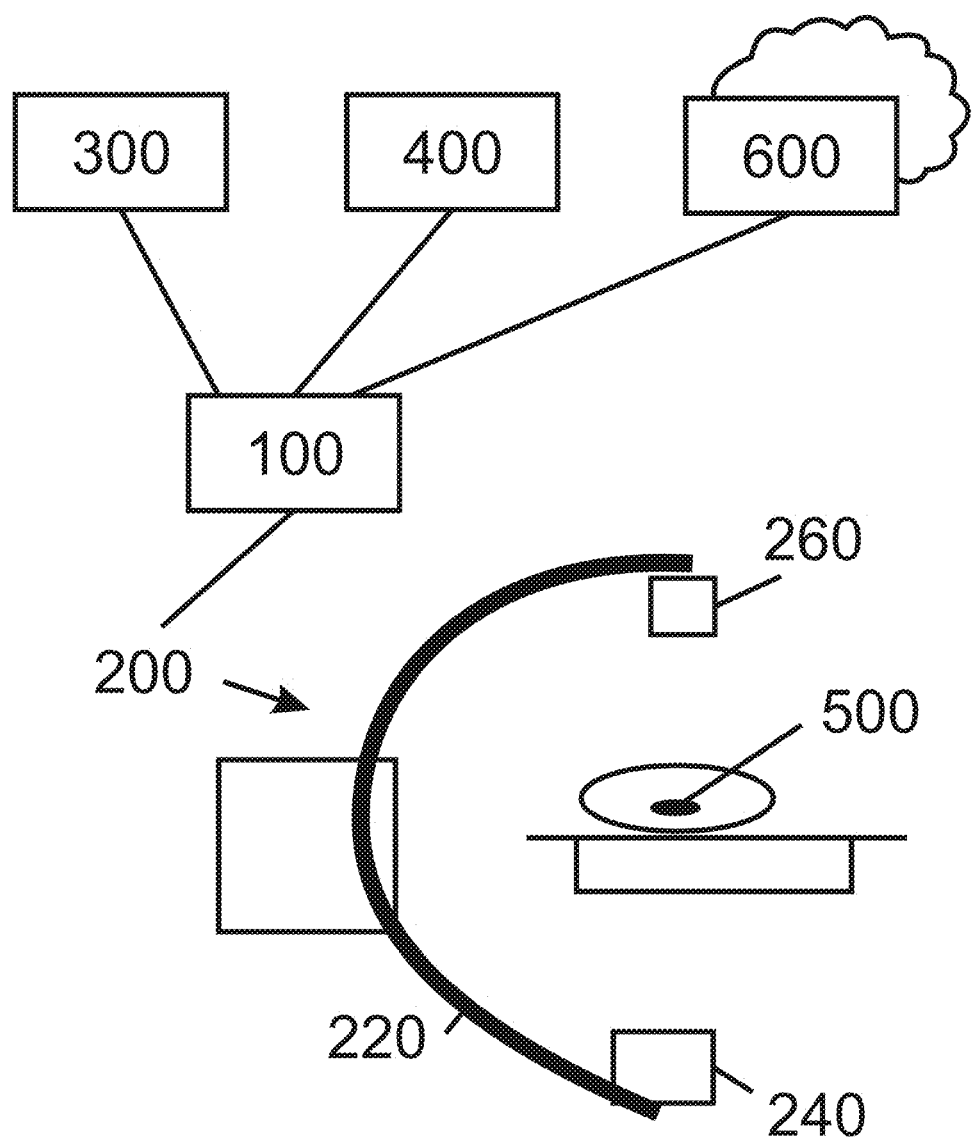
FIG. 2 shows aspects of a device in accordance with an embodiment.

FIG. 2 shows an exemplary embodiment of a device. Substantially a processing unit 100 is part of the device, necessary for performing the above described process. The device may further comprise an input device 300, for example a computer mouse, a trackball, a keyboard, a touchpad or the like, a monitor 400 which may also be a touch screen, and a data base 600 which may also be a remote data base like an internet cloud.

An exemplary imaging device 200 includes an X-ray source 240 and an X-ray detector 260, wherein these two devices are mounted on a C-arm 220. It will be understood that the device may also comprise a non-invasive imaging modality like a computer tomography device, a magnetic resonance device, or an ultrasound device as imaging device instead of or additional to the shown C-arm based X-ray device.

Finally, there is shown a region of interest 500. Within said region, for example a bone of a patient may be located which is to be treated.

During typical clinical procedures in order to treat a broken bone, a nail-type implant may be inserted into the bone more or less along the axis of the bone shaft. Those nails typically also have screw holes to be used with locking screws, which are inserted at a more or less predetermined angle through the nail into the bone. Common issues during those surgeries are (i) choosing the correct implant (e.g. based on CCD angle, antecurvation), (ii) finding the correct entry point of the bone for insertion of the nail, (iii) determining the ideal length of locking screws, (iv) finding a locking hole (if mechanical guidance is not sufficient), and (v) finding the correct bone reposition/comparing with a reference.

In the following, the invention is described by way of detailed examples. For example, an anterior/posterior imaging direction of a hip may be needed for a determination of a CCD angle and/or for a determination of an ideal length of a neck screw.

In order to find the ideal length of a neck screw, the femoral head may be reconstructed and shown. Possibly, a virtual representation of a not-yet implanted neck screw may be superimposed onto the X-ray image. This may allow the surgeon to read out the needed length of the neck screw at its lateral end, which should be close to the cortex of the femoral shaft. While the viewing direction of the X-ray imaging device may be less relevant for the tip of the screw, the viewing direction may be needed to show where exactly the end of the screw would be positioned relative to the shaft cortex. In order to determine this, a precise AP X-ray image would be beneficial for the procedure.

For detection of a sufficiently good anterior/posterior (AP) position of the hip, as needed for both examples above, an algorithm may search for detectable landmarks, e.g. for a femoral head, a lateral cortex of a femoral shaft, a visible part of a trochanter minor. For example, an algorithm may utilize a distance in a projection image between the center of the femoral head and the lateral shaft cortex, whose distance should be maximized for true AP, and/or a visible part of the lesser trochanter.

For detection of a sufficiently good anterior/posterior (AP) position of the pelvis, the algorithm may alternatively or additionally search for the arboretum foramen. The shape of the arboretum foramen is very clearly visible and typical, and its shape changes appearance significantly when rotated as it is a very large structure in typical pelvic X-rays done during total hip replacement with anterior approach.

When the bone is opened at the tip of the trochanter (visible in AP X-ray image), the precise opening location must not be too far away from the extension of the shaft axis, so there is the highest probability that the nail can be placed without interfering with bordering cortexes and that the nail will then run smoothly through the bone shaft.

When a nail is inserted, it is led by the cortex of the femoral shaft. For finding the correct entry point in the bone for insertion of the nail, the optimal compromise between shaft axis and neck axis must be determined because those two anatomical axes are not intersecting whereas the two axes of the implant are intersecting. Therefore, a lateral X-ray image may be needed from a specific oblique lateral position. This X-ray image should show the neck axis parallel to shaft axis.

For detection of a sufficiently good lateral position of the hip (where the center of the femoral head is positioned on, or sufficiently close to the extension of the femoral shaft axis), an algorithm could also search for detectable landmarks like a femoral head, a femoral shaft and/or an upper part of a greater trochanter. Based on the detection of the femoral shaft, the axis of the femoral shaft may be computed and extended by an algorithm. Based on the detection of the femoral head, the center of the femoral head may be computed. Based on the visibility and quality of detection of the femoral head, an algorithm may assign to the position of the computed center of the femoral head a higher or lower weight than to the shaft axis. Based on the detection of the upper part of the greater trochanter the midpoint of the detected arc may be computed. Based on the visibility of the arc of the upper greater trochanter, the algorithm may assign to the position of the midpoint of the arc a higher or lower weight than to the shaft axis.

While embodiments have been illustrated and described in detail in the drawings and afore-going description, such illustrations and descriptions are to be considered illustrative or exemplary and not restrictive, and the invention is not limited to the disclosed embodiments.

Other variations to the disclosed embodiments can be understood and effected by those skilled in the art in practising the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims.

The mere fact that certain measures are recited in mutually different dependent claims does not indicate that a combination of these measures can not be used to advantage. The computer program may be stored/distributed on a suitable medium such as an optical storage medium or a solid-state medium supplied together with or as a part of another hardware, but may also be distributed in other forms, such as via the Internet or other wired or wireless

The invention claimed is:

1. A device for interpreting an x-ray image, the device comprising a processing unit configured to receive image data representing the x-ray image, to determine an anatomic structure within the image data, and to determine an imaging direction of the x-ray image relative to the anatomic structure, wherein the anatomic structure is determined by means of a neural net, wherein the neural net is trained based on a multiplicity of x-ray images, wherein the processing unit is further configured to receive a desired imaging direction relative to the anatomic structure, and to determine a deviation between the determined imaging direction and the desired imaging direction.

2. The device of claim 1, further comprising a point distribution model, wherein the neural net in combination with the point distribution model are configured to determine the anatomic structure within the image data.

3. The device of claim 1, wherein the plurality of x-ray images comprise at least one simulated x-ray image.

4. The device of claim 1, wherein the processing unit is further configured to identify at least two features of the anatomical structure and a relationship between the at least two features.

5. The device of claim 1, wherein the processing unit is further configured to determine the anatomical structure using an edge detection algorithm.

6. The device of claim 1, wherein the processing unit is further configured to determine a 3D orientation of the anatomical structure relative to the imaging direction of the x-ray image.

7. The device of claim 1, wherein the processing unit is further configured to a determine movements of the x-ray imaging device for all available degrees of freedom and to a provide adjustment instructions so that the x-ray imaging device can be repositioned for generating an x-ray image with the desired imaging direction.

8. A method of interpreting of an x-ray image, the method comprising:
generating image data of the x-ray image;
training a neural net using image data for a plurality of x-ray images;
determining an anatomic structure within the image data using the neural net; and
determining an imaging direction relative to the anatomic structure,
receiving a desired imaging direction relative to the anatomic structure, and
determining a deviation between the determined imaging direction and the desired imaging direction.

9. The method of claim 8, further comprising determining a 3D orientation of the anatomical structure relative to the imaging direction of the image data.

10. The method of claim 8, further comprising:
determining movements of the x-ray imaging device for all available degrees of freedom; and
a providing adjustment instructions so that the x-ray imaging device can be a repositioned for generating an x-ray image with the desired imaging direction.

11. A computer program product comprising a processing unit operably connected to a memory having a sets of instructions which when executed on the processor unit carries out a method of interpreting of an x-ray image comprising:
generating image data of the x-ray image;
training a neural net using image data for a plurality of x-ray images;
a determining an anatomic structure within the image data using the neural net;
determining an imaging direction relative to the anatomic structure; receiving a desired imaging direction relative to the anatomic structure, and determining a deviation between the determined imaging direction and the desired imaging direction.

12. The computer program product of claim 11, further comprising a set of instructions which when executed on the processor unit carries out a method of interpreting of the x-ray image which includes determining a 3D orientation of the anatomical structure relative to the imaging direction of the image data.

13. The computer program product of claim 11, further comprising a set of instructions which when executed on the processor unit carries out a method of interpreting of the x-ray image which includes:
identifying a reference direction; and
determining a deviation between the imaging direction and the reference direction.

14. The computer program product of claim 11, further comprising a set of instructions which when executed on the processor unit carries out a method of interpreting of the x-ray image which includes:
a determining movements of the x-ray imaging device for all available degrees of freedom; and
a providing adjustment instructions so that x-ray the imaging device can be a repositioned for generating x-ray image with the desired imaging direction.

* * * * *